United States Patent [19]

Asada et al.

[11] Patent Number: 5,137,594

[45] Date of Patent: Aug. 11, 1992

[54] MOLDINGS AND METHOD FOR FORMING THE SAME

[75] Inventors: Shiro Asada; Ikuo Takiguchi; Fujio Itani, all of Toyohashi, Japan

[73] Assignee: Mitsubishi Rayon Co., Ltd., Tokyo, Japan

[21] Appl. No.: 415,246

[22] PCT Filed: Jan. 20, 1989

[86] PCT No.: PCT/JP89/00051

§ 371 Date: Sep. 13, 1989

§ 102(e) Date: Sep. 13, 1989

[87] PCT Pub. No.: WO89/06667

PCT Pub. Date: Jul. 27, 1989

[30] Foreign Application Priority Data

Jan. 21, 1988 [JP] Japan .................................. 63-11721

[51] Int. Cl.$^5$ ........................... C09J 5/02; D03D 3/00

[52] U.S. Cl. ................................. 156/307.4; 156/285;
156/286; 428/224; 428/288; 428/902; 428/241;
428/245; 428/294; 428/408

[58] Field of Search ............... 428/408, 913, 245, 294;
264/241, 258; 156/285, 307.4, 307.3, 307.7

[56] References Cited

U.S. PATENT DOCUMENTS

| | | | |
|---|---|---|---|
| 4,173,670 | 11/1979 | Van Auken | 428/398 |
| 4,568,733 | 2/1986 | Parker et al. | 428/408 |
| 4,714,648 | 12/1987 | Nagata | 428/408 |
| 4,816,106 | 3/1989 | Tuttis et al. | 156/285 |

Primary Examiner—Patrick J. Ryan
Assistant Examiner—Richard C. Weisberger
Attorney, Agent, or Firm—Oblon, Spivak, McClelland, Maier & Neustadt

[57] ABSTRACT

A carbon fiber reinforced thermosetting resin molding formed from unidirectionally-arranged carbon fiber prepregs which contain the resin in an amount of 19 to 27% by weight and a method for producing such moldings.

13 Claims, 2 Drawing Sheets

MOLDINGS AND METHOD FOR FORMING THE SAME

TECHNICAL FIELD

The present invention relates to novel moldings formed from prepregs of unidirectionally arranged carbon filaments and to a method for forming said moldings.

BACKGROUND ART

Carbon fiber reinforced resin moldings produced by impregnating oriented carbon fibers with thermosetting resins, arranging filaments of these fibers unidirectionally to form prepregs, followed by multilayer lamination of these prepregs and molding and curing of resulting laminates are used extensively as industrial materials such as plate springs and honeycomb constructing materials and as sporting or leisure goods such as fishing rods and golf shafts. Recently, those moldings have also been used as members of aircraft, automobiles, ships, and the like.

Performance characteristics of carbon fibers used have also been improved remarkably in recent years; of polyacrylonitrile-based carbon fibers, there have been developed and marketed a high strength, high elongation type having tensile strengths exceeding 600 $Kg/mm^2$ and a high strength, high elastic modulus type having tensile strengths of at least 300 $Kg/mm^2$ and tensile elastic moduli of 46-50 $ton/mm^2$. Performance characteristics required for moldings reinforced with those carbon fibers have been sophisticated more and more against the background of improved performance characteristics of raw material carbon fibers.

The first step of improving the performance of carbon fiber reinforced resin moldings was the enhancement of the adhesive strength between the carbon fiber and the matrix resin. About this matter, extensive researches and developments were made energetically for the past some dozen years and the adhesive strength is settled now on a considerably high level owing to the technique of electrolytic oxidation, the technique of gas-phase oxidation, and some other techniques. Seeing the last several years, however, no marked advance is observed in this art and there is no prospect that properties such as the interlayer shear strength will be improved to large extents in the near future.

While there are already published some reports (Japanese Patent Application Kokai No. Sho. 57-49612, etc.) that a modification of matrix resin contributes to the improvement of its carbon fiber reinforced moldings in performance, not much improvement of the moldings themselves in performance can be expected from the modification of resin when the modified resin has a curing temperature of the same degree. But, matrix resins having higher curing temperatures, higher crosslinking density, and higher stiffness exhibit generally higher interlayer shear strength and higher flexural strength, according to the present inventors' empirical knowledge.

DISCLOSURE OF INVENTION

According to the prior art, the combination of carbon fibers with modified matrix resins having curing temperatures of the same degree, in any case, does not effect the performance improvement of carbon fiber reinforced composite moldings in spite of the recent markedly improved performance of carbon fibers. That is the present situation of the art. A particular problem in the art is that the enhanced tensile strength of carbon fibers does not contribute to the improvement of moldings reinforced with these carbon fibers in flexural strength or compression strength, in other words, however, high the strength of used carbon fiber may be, the flexural strength or compression strength improvement over a certain extent will not be observed so far as the matrix resins used are the same.

Figure 1:
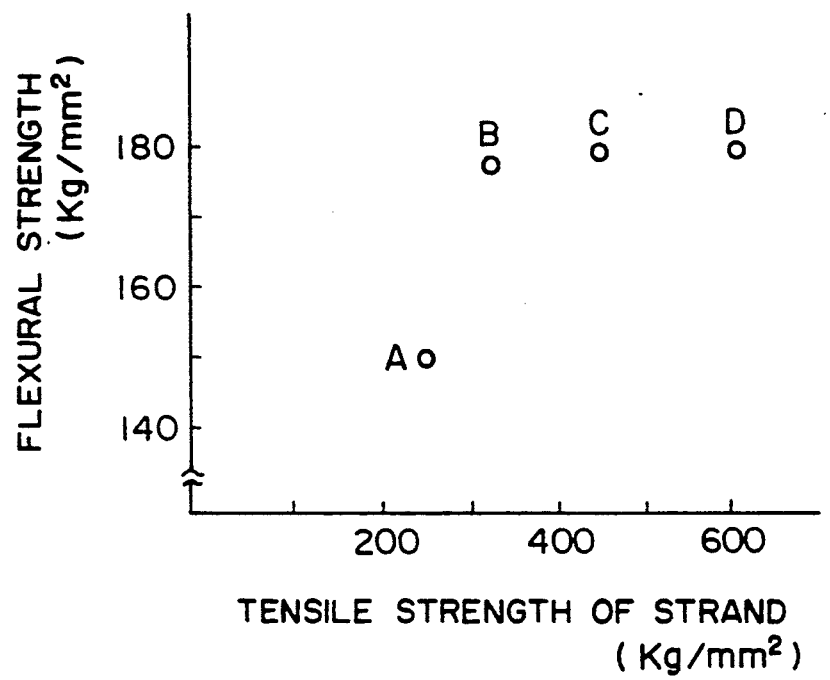
FIG. 1 is a graph showing the relation between the flexural strength of molded plate and the tensile strength of carbon fiber strand.

FIG. 1 is a graph showing the relations of the three-point flexural strengths of plates molded from combinations of a bisphenol A type epoxy resin (curing temperature 130° C.) with four types of unidirectionally arranged carbon fibers different in tensile strength to the strengths of carbon fiber strands used. Conditions of the measurements were as follows: dimensions of test specimens = 100 mm (length in the direction of fiber axis) ×10 mm (width) ×2 mm (thickness), span length = 80 mm, span/thickness ratio = 40, R's of loading nose and supports = ⅛ inch, crosshead speed = 5 mm/min, environmental conditions = 21° C. and 50% RH. The found flexural strengths were converted to the values of moldings of 60 vol % fiber content.

As is evident from FIG. 1, molded resin plates reinforced with carbon fibers having higher strand strengths exhibit flexural strengths of about 180 $Kg/mm^2$ and no higher value than those.

Moreover, observation of broken test specimens after this bending test reveals that the break of specimen A began at the tensile stress receiving side while the breaks of specimens B, C, and D reinforced with fibers of higher strand strengths began all at the compression stress receiving sides. This implies that the enhancement of the tensile strength is not accompanied by the enhancement of the compression strength and hence the rate of break on bending is determined or dominated by the rate of break due to compression. A conceivable cause of this is that the break due to compression may take place under the action of complicated factors such as the buckling of fiber, the adhesive strength between the fiber and the matrix resin, and the elastic modulus of matrix resin, that is, the break may occur through a mechanism different from the tensile mechanism.

Taking into consideration that when carbon fiber reinforced resin moldings are used practically, almost all the end products including plate springs, fishing rods, and golf shafts are subjected to flexural deformation or if some of the end products are broken, almost all the causes of the breakage may be bending forces, it may be a very significant problem that no carbon fiber reinforced resin molding can be obtained as stated above that has higher flexural strength than a certain level.

Another serious problem in the usage of carbon fiber reinforced resin moldings as industrial materials or sporting or leisure goods is that in order to produce moldings of high elastic moduli or high stiffness, it is necessary in general to use a high elastic modulus type of carbon fiber, which is very expensive, and as a rule, carbon fiber reinforced resin moldings having the higher elastic moduli exhibit much the lower compression strength and flexural strength.

In order to improve carbon fiber reinforced resin moldings in flexural strength as well as in elastic modulus, the present inventors made extensive investigations on increases in the carbon fiber content of moldings to large extents over the generally used level, and have accomplished to present invention.

In the prior art, attempts to increase the carbon fiber content of moldings are made by decreasing the resin content of intermediary materials such as prepregs or the like.

Such decrease in resin content is generally carried out in the manner that a part of the resin is sucked out with a bleeder cloth or squeezed out by applying an extra pressure. As reported in "Kogyo Zairyo", Vol. 31, No. 2 pp. 24–28, (1983), however, the interlayer shear strength, in particular, of carbon fiber reinforced resin moldings, when the fiber volume content (hereinafter abbreviated as Vf) is at least 65–67%, decreases rapidly with an increase in Vf and this is accompanied particularly by much lowering in the interlayer shear strength which determines the rate of break on bending. Accordingly, carbon fiber reinforced resin moldings having Vf values exceeding 65%, in consideration of variation in Vf, are regarded as risky with respect to properties and hence are seldom investigated and there is no case where such moldings are put to practical use.

The present inventors noted that the resin weight content of commercially available, unidirectionally arranged carbon fiber prepregs is about 30% at the lowest and the Vf of products of molding such prepregs while inhibiting the resin outflow is 63–64% at the highest, though depending on the densities of carbon fiber and resin, and that no molding of 65% of more Vf can be obtained according to the prior art unless a part of the resin is sucked out with a bleeder cloth or squeezed out by applying pressure, and have found out the fact that this resin displacement at the time of molding brings about a nonuniform distribution or dispersion of fiber in high-Vf moldings, hence lowering markedly the interlayer shear strength and the flexural strength.

BEST MODE FOR CARRYING OUT THE INVENTION

The present invention is summarized as follows: An aspect of the invention is a carbon fiber reinforced thermosetting resin molding, superior in mechanical properties, formed from unidirectionally-arranged carbon fiber prepregs which, as compared with those hitherto used, contain the resin in a very small amount, more specifically, in an amount of 19 to 27% by weight. Another aspect of the invention is a method for producing carbon fiber reinforced thermosetting resin moldings wherein the carbon fiber volume content is from 67 to 75%, the method comprising laminating together unidirectionally-arranged carbon fiber prepregs containing the resin in an amount of 19 to 27% by weight, so that the resin content decrease due to the resin outflow during the lamination and molding may not exceed 2%, preferably 1%, by weight.

According to the present invention, it is possible to obtain carbon fiber reinforced thermosetting resin moldings having sufficient interlayer shear strength as well as Vf-corresponding flexural strength and elastic moduli. The prepregs used in the present invention are prepared desirably by the solventless, hot-melt impregnation method. This is because microvoids caused by residual volatile matter are observed in the prepregs prepared by the solvent-diluting impregnation method.

In the hot-melt impregnation method, the so-called single-film method that comprises impregnating a sheet of carbon fiber aggregate with a resin by applying a resin film supported by release paper onto one side of the carbon fiber sheet is preferred to the double-film method that comprises similar impregnation but by applying a resin film supported by release paper onto each side of the carbon fiber sheet.

According to the double-film method, very thin resin films, though depending on the basis weight of prepregs, need to be formed accurately on sheets of release paper in order to prepare prepregs of such low resin contents as in the present invention. Even when such resin films can be formed accurately, many unimpregnated portions remain in the middle laminar region since a resin enters the fiber sheet at both the sides thereof, and the unimpregnated portions are responsible for leaving voids after molding.

According to the conventional solventless, hot-melt impregnation method, however, it is very difficult to accomplish the impregnation so as to provide prepregs in which the resin content is as low as 27% by weight or less and no such prepreg is commercially available. Therefore the present inventors investigated to determine the appropriate viscosity level of an impregnating resin for the purpose of preparing prepregs of such low resin contents.

Figure 2:
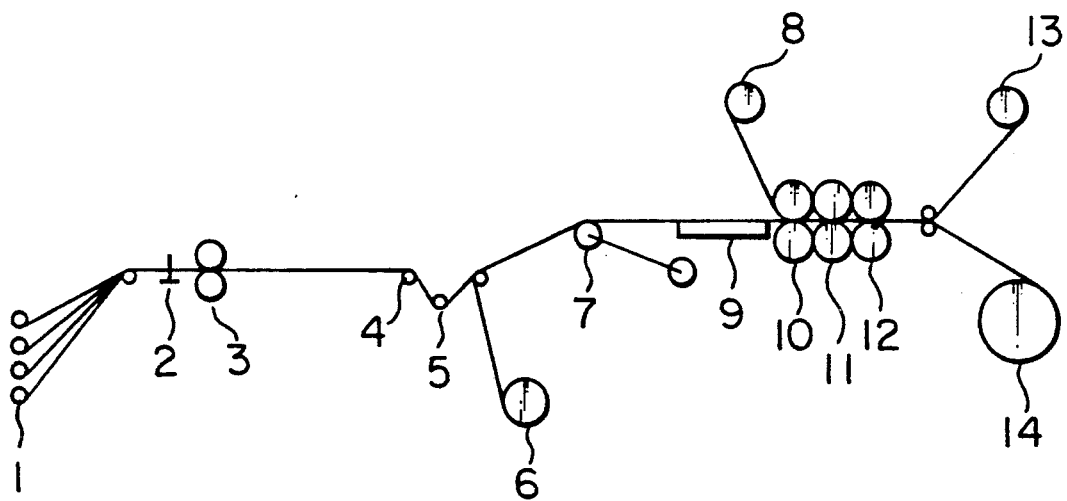
FIG. 2 is a schematic illustration of the apparatus used in the present invention for producing prepregs.

FIG. 2 is a schematic illustration of a prepreg production apparatus used in the investigation of impregnation.

Numerals in FIG. 2 have the following meaning: 1; a creel, 2: a comb, 3: a feed roll, 4 and 5: fiber opening devices, 6: release paper coated with an epoxy resin 7: a dancer roll for tension control, 8: a polyolefin film for covering, 9: a plate heater for preheating and impregnation, 10, 11 and 12: heated nipping rolls for impregnation purposes, 13: a cover-film winder, 14: a prepreg winder.

Using this apparatus, sheets of 100 g/m$^2$ fiber basis weight were prepared from tows of carbon fiber, and a study was made of the impregnation of these sheets with epoxy resins of varying viscosities applied on sheets of release paper. Results of the study are shown in Table 1. For convenience, the resin viscosity used in this study is the lowest value measured at 90±0.2° C. by using a rotational viscometer. Table 1 reveals the following: At the resin viscosity level where the prepreg of about 30 wt % resin content was good in both the state of impregnation and tackiness, the impregnation becomes much more difficult as the resin weight content is decreased to 27% and further to 19%. However, when the resin viscosity is lowered to a certain level, the impregnation becomes possible even for prepregs of lower resin weight contents. Even with the resin of such a low viscosity level that the prepreg containing 30 wt % of this resin is problematic in workability because of having too high tackiness, the tackiness lowers and the workability becomes less problematic, as the resin weight content is decreased. When the resin content is less than 23 wt %, no layer of resin, even though the resin has a low viscosity, will form on the surface of prepregs and hence the prepregs will have practically no tackiness, that is, the prepregs will be in a dry tack state and difficult to adhere to one another in the lamination. But such prepregs can also be used by heating with an iron at the time of lamination or by combining with other tacky prepregs of higher resin weight contents.

While prepregs of such low resin weight contents are deficient in adhesion to customary release paper for prepreg applications and hence may be worse in workability, this problem can be solved by using release paper made more sticky by changing the kind of release agent or the method for treating the release agent.

Figure 4:
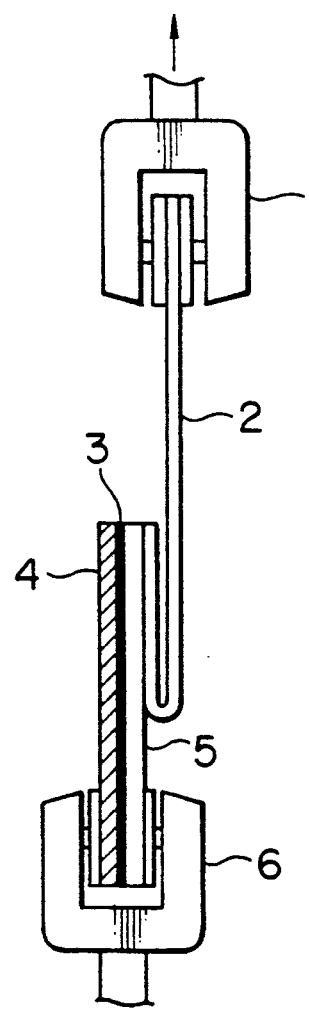
FIG. 4 is a schematic illustration of an instrument for measuring releasing characteristics of release paper sheets. In this drawing, 1 and 6: chucks of a tensile tester, 2: an adhesive tape (adhering surface), 3: a double sided adhesive tape for fixing a test specimen, 4: a supporting metal plate, and 5: a release paper sheet (control surface) to be tested.

The present inventors evaluated release characteristics of different kinds of release paper by a method of 180° peeling an adhesive tape as shown in FIG. 4. The result showed that suitable peel strengths of the prepreg-carrying surface of the release paper to be used in the present invention are from 300 to 600 g/25 mm width, particularly from 350 to 500 g/25 mm width.

The peel strength was measured under the environmental conditions of 21° C. and 50% RH using a single-sided adhesive tape "Scotch #250" made by Sumitomo-3M Co., Ltd. as a standard adhesive tape; the speed of peeling by using a tensile tester was 50 mm/min and other measurement conditions were in accordance with JIS Z 0237.

Peel strengths of the prepreg-carrying surfaces of existing commercially available sheets of release paper for prepreg applications were from 50 to 250 g/25 mm width as measured by the above method. The peel strength exceeding 600 g/25 mm width is too high for peeling the release paper with ease even from prepregs of resin contents according to the present invention.

However, when the resin viscosity is lowered excessively, the strength of prepreg in the direction perpendicular to the prepreg fiber axis is lost and hence the prepreg becomes liable to tear lengthwise and the workability of prepreg becomes worse.

In any case, when proper resin viscosity is chosen, even prepregs of resin content as low as 27% by weight or less can be put to practical use by optimizing release characteristics of the release paper and by a proper method for using it.

From results of the investigation which were as shown in Table 1, the present inventors confirmed that prepregs of resin content as low as 27 wt % or less can be prepared by using a resin having a proper viscosity level, and then conducted the following test: Using unidirectionally-arranged carbon fiber prepregs prepared in the above investigation, about 2-mm thick laminates comprising unidirectionally arranged carbon fiber were molded, and rectangular test pieces of 100 mm L (in the direction of fiber axis) ×10 mm W were prepared from the laminates and subjected to a three-point bending test and to an interlayer shear strength test according to the short beam method. For comparison, similar test pieces were prepared from prepregs of 100 g/m² fiber basis weight and about 29 wt % and about 33 wt % resin contents and subjected to the same tests. In these experiments, the used carbon fiber was of a grade exhibiting a tensile strength of 360 Kg/mm² and a tensile elastic modulus of 24 ton/mm², the epoxy resin mainly used was of a bisphenol A diglycidyl ether type denatured, i.e. thickened with diaminodiphenyl sulfone, and the other used epoxy resins were the same resin but containing dichlorophehyldimethylurea as a curing catalyst and bisphenol A or bisphenol F diglycidyl ether type of epoxy compound (n=0–1) as a diluent. The viscosity of resins was adjusted by controlling the degree of denaturing the main component epoxy resin and the amount of diluent to be added.

The laminates were formed by compression molding. The resin outflow was controlled by (i) superposing a nylon taffeta and a glass fiber bleeder cloth on each side of the laminate and (ii) varying the molding pressure.

Table 2 shows results of the three-point bending test and results of the interlayer shear strength test by the short beam method.

It is evident from Table 2 that test pieces molded with the resin outflow inhibited, even when having high Vf's of 67% and more, exhibit limited reduction in interlayer shear strength and their flexural strengths and flexural elastic moduli show tendencies to increase with an increase in Vf. On the other hand, prepregs of about 29 wt % or about 33 wt % resin content provided with high Vf's by draining large amounts of resin exhibit lowered interlayer shear strengths and the flexural strength of these prepregs is not high in spite of their high Vf's. In addition, with an increase in the amount of resin drained in this case, the interlayer shear strength much lowers and the flexural strength also lowers.

Table 2 also reveals that when prepregs of 27 wt % and less resin contents are subjected to compression molding, the reduction of resin content due to the resin outflow is only about 1 wt % at a molding pressure of about 15 Kg/cm² and the reduction in interlayer shear strength is limited, but when more than about 2 wt % of the resin content is reduced by draining larger amounts of resin under raised pressure, the interlayer shear strength lowers considerably. On the other hand, when more than 2-3 wt % of the resin content is reduced by causing resin outflow with a bleeder cloth, the interlayer shear strength lowers remarkably. In the case of prepreg moldings in which Vf's are up to 65%, such lowering of interlayer shear strength caused by the resin outflow is relatively small, raising no problem.

When prepregs of high Vf's exceeding 67% are molded in such a manner as to drain large amounts of resin during the molding; the resin outflow does not uniformly occur throughout the moldings; for instance, preferential resin outflow, in case of compression molding, occurs from the fiber-axial end portions and when a bleeder cloth is used, from the surface layer in contact with the cloth; and in addition because of the originally small amount of resin, it is considered that resin-lacking sites or microvoids develop collectively among monofilaments and this deteriorates properties such as the interlayer shear strength, flexural strength, and compression strength.

From experimental results shown in Table 2 and from results of other investigation, the maximum reduction in the resin content that does not result in lowering of the quality of moldings is found to be about 2 wt %, preferably 1 wt %.

In the molding of fishing rods, golf schafts, etc. by the tape wrapping method, it is generally difficult to control the resin outflow, particularly to drain large amounts of resin during the molding. For instance it is considerably difficult to form prepregs of 30 wt % resin content into products of at least 67% Vf. Even if such forming is possible, no product will be obtained but those which have nonuniform resin distributions and hence low interlayer shear strength and flexural strength. Molding of prepregs of 19-27 wt % resin content, according to the present invention, can provide moldings of Vf's as high as 67% and more without difficulty, though depending on the density of carbon fiber and on the density of resin, and can achieve a high flexural strength and a high flexural elastic modulus which are in proportion to the Vf.

When using an epoxy resin which after curing exhibits higher stiffness than do epoxy resins of the bisphenol A diglycidyl ether type after curing, it is possible to achieve a further higher flexural strength on account of an effect of improvement in flexural strength brought about by the improvement of Vf of the present invention in addition to the originally high flexural strength.

However, an upper limit of Vf's is also observed. Even though prepregs are molded with the resin outflow inhibited, Vf's exceeding about 75% will result in marked reduction in the interlayer shear strength and cause reduction in the flexural strength. Accordingly, when prepregs in which the resin content is lower than about 19 wt % are used, the Vf of the resulting moldings exceeds 75% however the resin outflow is inhibited. This is undesirable.

Preferred carbon fiber contents of moldings according to the present invention are from 69 to 73 vol %.

When the Vf is excessively high, monofilaments will contact with one another without mediation of matrix resin or a large number of so-called nests of voids develop that are clusters of voids, even though the resin outflow is inhibited at the time of molding.

EXAMPLE

The following examples illustrate the present invention.

EXAMPLE 1

Using a prepreg production apparatus as shown in FIG. 2, a prepreg of 23.0 wt % resin content and 165 g/m$^2$ fiber basis weight was prepared by combining a high-tenacity carbon fiber (tensile strength 360 Kg/mm$^2$, tensile elastic modulus 24 ton/mm$^2$) with a 130° C. curing type epoxy resin coating on a release paper sheet having a peel strength of 400 g/25 mm width. On this prepreg was crosswise sticked an extra thin, commercial, unidirectionally arranged carbon fiber prepreg (resin content 37.3 wt %, fiber basis weight 27 g/m$^2$, 130° C. curing type epoxy resin matrix) for transverse reinforcement. This prepreg laminate was coiled four turns around a 10-mm $\phi$ iron mandrel with the former prepreg fiber axis directed lengthwise and with the latter prepreg being on the inner side. The coiled laminate, wrapped with a polypropylene tape (15 mm wide) at a tape tension of 3 kg/15 mm, was hardened in a curing oven at 130° C. for 2 hours, forming a pipe 600 mm long. During this pipe formation, the resin outflow including that from the transversely reinforcing prepreg was up to 0.5 wt % in terms of the percentage reduction in resin content.

For comparison, a commercial, unidirectionally arranged carbon fiber prepreg (fiber tensile strength 360 Kg/mm$^2$, fiber tensile elastic modulus 24 ton/mm$^2$, resin content 30 wt %, fiber basis weight 150 g/m$^2$, 130° C. curing type epoxy resin matrix) was laminated with the same extra thin prepreg as used in the above example. Then a pipe 600 mm long was formed from this laminate according to the above procedure by using a 10-mm $\phi$ mandrel. The reduction of region content due to the resin outflow during the pipe formation was also up to 0.5 wt %.

Figure 3:
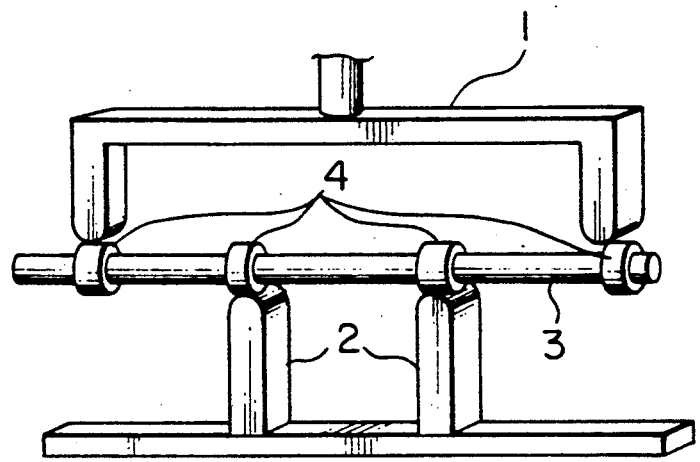
FIG. 3 is a schematic illustration of an instrument used for the four-point bending test of pipes.

A four-point bending test was made on these pipes to measure their flexural strengths and flexural elastic moduli. Results of the measurement are shown in Table 3. FIG. 3 shows schematic illustrations of measurement jigs used in these evaluations. In this drawing; 1: a movable presser, 2: a fixed pressure, 3: a CFRP sample, and 4: a metal ring of 11.5 mm inner diameter, 2 mm thickness, and 10 mm width for preventing stress concentration at the presser section. Conditions of the measurement were as follows: Movable presser span length 150 mm, crosshead speed 5 mm/min, environmental conditions 21° C. and 50% RH.

As is evident from Table 3, the pipe formed according to the method of the present invention exhibits about 15% higher flexural strength and flexural elastic modulus than does the pipe formed from a commercial prepreg according to the prior art method, in spite of nearly the same weight and the same wall thickness of both pipes.

EXAMPLE 2

Similarly to the procedure of Example 1; a prepreg of 25 wt % resin content and 152 g/m$^2$ fiber basis weight was prepared by combining a high strength, high elastic modulus carbon fiber (tensile strength 420 Kg/mm$^2$, tensile elastic modulus 40 ton/mm$^2$, density 1.81 g/cm$^3$) with a 130° C. curing type epoxy resin; on this prepreg was crosswise sticked an extra thin, commercial, unidirectionally arranged carbon fiber prepreg (resin content 37.3 wt %, fiber basis weight 27 g/m$^2$, 130° C. curing type epoxy resin matrix) for transverse reinforcement; this prepreg laminate was coiled four turns around a 10-mm $\phi$ iron mandrel with the former prepreg fiber axis directed lengthwise and with the latter prepreg being on the inner side; and the coiled laminate, wrapped with a polypropylene tape (15 mm width) at a tape tension of 3 Kg/15 mm, was hardened in a curing oven at 130° C. for 2 hours, forming a pipe 600 mm long.

During this pipe formation, the resin outflow including that from the transversely reinforcing prepreg was up to 0.5 wt % in terms of the percentage reduction in resin content.

After completion of bending test, the outermost layer (the layer in which the fiber axis is lengthwise) was peeled off and the resin content of this layer was determined by the acid decomposition method. The found reduction in resin content was up to 1 wt %.

For comparison, a commercial, unidirectional prepreg formed from an ultra high elastic modulus carbon fiber having a tensile elastic modulus of 46 ton/mm$^2$ (fiber tensile strength 330 Kg/mm$^2$, fiber density 1.88 g/cm$^3$, resin content 33 wt %, fiber basis weight 139 g/m$^2$, 130° C. curing type epoxy resin matrix) was laminated with the same extra thin prepreg as used in the above example. Then a pipe 600 mm long was formed from this laminate according to the above procedure.

On these pipes, a four-point bending test was conducted in the same manner as in Example 1. Results of the test are shown in Table 4.

Further, test pieces of 100 mm fiber-axial length, 10 mm width, and 2 mm thickness were prepared by compression molding from the above prepreg of 25 wt % resin content comprising a high elastic modulus carbon fiber having a tensile elastic modulus of 40 ton/mm$^2$ and from the above commercial ultra high elastic modulus carbon fiber prepreg used for comparison, and were subjected to a four-point bending test under the following conditions: span length 80 mm, span-to-thickness ratio 40:1, nose and support R's ⅛ inch, crosshead speed 5 mm/min, environmental conditions 21° C. and 50% RH. Results of this test are shown in Table 5.

Vf in Table 5 was calculated from the fiber weight content determined by the acid decomposition method and from the resin density (1.25 g/cm³) and the carbon fiber density according to the following formula:

$$Vf(\text{vol }\%) = \frac{\rho_R}{\rho_R + \rho_{CF} \cdot \left(\frac{100}{wf} - 1\right)} \times 100$$

(wherein, $\rho_R$=resin density, $\rho_{CF}$=carbon fiber density, and Wf=fiber weight content (%)).

As is evident from Table 4, the pipe obtained in the example of the present invention has higher flexural strength than that of the pipe obtained in the example for comparison by as much as 40% whereas both the pipes have the same weight, wall thickness, and flexural elastic modulus. This is because when using prepregs which are lower in flexural elastic modulus than other prepregs of the same Vf but comprise a carbon fiber capable originally of providing higher flexural strength it is possible in the present invention to produce pipes having flexural elastic moduli of the same degree; hence it is possible in the present invention to achieve higher flexural strength than the value proportional to the Vf. In other words, when using a prepreg made from a carbon fiber low in the tensile elastic modulus (generally, in carbon fiber, with decreasing of tensile elastic modulus, tensile strength is increased) and being low in resin weight content, the bending strength of the pipe obtained is higher than that of a prepreg made from a carbon fiber high in the elastic modulus and having an ordinary resin weight content. This is also evident from results of a threepoint bending test which are shown in Table 5. In this case, the flexural strength of the pipe obtained in the example of the present invention is higher than that of the pipe obtained in the example for comparison by about 23%, when both flexural strength values are converted to the same Vf (60%) basis, and by about 40% when such conversion is not made, while the flexural elastic moduli of both pipes are nearly the same.

The pipe according to the present invention, as shown in Table 4, comprises an about 10 wt % larger amount of carbon fiber used lengthwise than does the pipe of the example for comparison and the carbon fiber of a 40 ton/mm² tensile elastic modulus grade used in the former pipe is much inexpensive as compared with the carbon fiber of a 46 ton/mm² tensile elastic modulus grade used in the latter pipe. Hence, pipes according to the present invention can be produced at sufficiently lower costs than pipes according to the example for comparison.

COMPARATIVE EXAMPLE 1

In the same manner as in Example 1; a prepreg of 30 wt % resin content and 165 g/m² fiber basis weight was prepared and then laminated crosswise with an extra thin carbon fiber prepreg, and the obtained laminate was coiled four turns around a 10-mm φ iron mandrel, then wrapped with a polyester tape (15 mm wide) having on one side a release agent coating, at a tape tension of 6 Kg/15 mm, twice as high as the tape tension applied in Example 1, and hardened in a curing oven at 130° C. for 2 hours, thus forming a pipe 600 mm long. In this pipe formation, the resin outflow was about 6 wt % in terms of the percentage reduction in the resin content of the whole prepreg including the extra thin prepreg.

On this pipe a four-point bending test was conducted according to the method of Example 1. Results of this test are shown in Table 6.

The outermost layer (the layer in which the fiber axis is lengthwise) of the pipe after bending destruction was peeled off by using a cutter knife, and the resin weight content of this layer was measured. The found content was about 19 wt %. That is, the percentage reduction of the resin content of the outermost layer, caused by the resin outflow, was very as high as 11 wt %, revealing that concentrated resin outflow occurs from the outermost layer.

It is clear from Table 6 that the pipe of high Vf formed according to the prior art acquires a high elastic modulus but has conversely a low flexural strength.

TABLE 1

| No. | Resin content (wt %) | Viscosity of resin (poise at 90° C.) | Impregnation state of prepreg | Tackiness | Strength of prepreg in the 90° direction |
|---|---|---|---|---|---|
| 1 | 30.2 | 24 | ○ | proper | ○ |
| 2 | 26.8 | 24 | Δ | slightly low | ○ |
| 3 | 22.4 | 24 | x | low | ○ |
| 4 | 19.5 | 24 | xx | low | ○ |
| 5 | 30.2 | 18 | ○ | high | ○ |
| 6 | 26.8 | 18 | ○ | slightly high | ○ |
| 7 | 22.4 | 18 | Δ | dry tack | ○ |
| 8 | 19.5 | 18 | x | dry tack | ○ |
| 9 | 30.2 | 10 | ○ | very high | Δ |
| 10 | 26.8 | 10 | ○ | high | Δ |
| 11 | 22.4 | 10 | ○ | dry tack | Δ |
| 12 | 19.5 | 10 | Δ | dry tack | Δ |
| 13 | 17.5 | 10 | x | dry tack | Δ |
| 14 | 22.4 | 5 | ○ | dry tack | x |
| 15 | 19.5 | 5 | ○ | dry tack | x |

○: Good
Δ: Slightly bad
x: Bad, a large number of dry filaments are present.
xx: Very bad, a great number of dry filaments are present.

○: Good
Δ: Slightly low
x: Low

TABLE 2

| No. | Resin content of prepreg (wt %) | Viscosity of resin (poise at 90° C.) | Impregnation state of prepreg | Tackiness of prepreg | Molding condition Bleeder cloth | Molding pressure (Kg/cm$^2$) | Resin outflow, reduction in resin content (wt %) |
|---|---|---|---|---|---|---|---|
| 1 | 33.4 | 24 | Good | Proper | No | 15 | 3.4 |
| 2 | 29.1 | " | " | " | " | " | 2.6 |
| 3 | 26.8 | 18 | " | Low | " | " | 1.7 |
| 4 | 22.4 | 10 | " | Dry tack | " | " | 1.0 |
| 5 | 19.5 | " | Slightly bad | " | " | " | 0.4 |
| 6 | 17.5 | " | Bad | " | " | " | 0.0 |
| 7 | 33.4 | 24 | Good | Proper | Used | 15 | 5.2 |
| 8 | 29.1 | " | " | " | " | " | 4.1 |
| 9 | 26.8 | 18 | " | Low | " | " | 3.8 |
| 10 | 22.4 | 10 | " | Dry tack | " | " | 2.8 |
| 11 | 19.5 | " | Slightly bad | " | " | " | 2.2 |
| 12 | 17.5 | " | Bad | " | " | " | 1.5 |
| 13 | 33.4 | 24 | Good | Proper | No | 30 | 4.3 |
| 14 | 29.1 | " | " | " | " | " | 3.3 |
| 15 | 26.8 | 18 | " | Low | " | " | 2.8 |
| 16 | 22.4 | 10 | " | Dry tack | " | " | 2.2 |
| 17 | 19.5 | " | Slightly bad | " | " | " | 1.1 |
| 18 | 17.5 | " | Bad | " | " | " | 0.5 |
| 19 | 33.4 | 24 | Good | Proper | " | 50 | 6.2 |
| 20 | 29.1 | " | " | " | " | " | 4.4 |
| 21 | 26.8 | 18 | " | Low | " | " | 3.6 |
| 22 | 22.4 | 10 | " | Dry tack | " | " | 2.9 |
| 23 | 19.5 | " | Slightly bad | " | " | " | 2.1 |
| 24 | 17.5 | " | Bad | " | " | " | 1.0 |

| No. | Theoretical Vf (vol %) | Not converted to Vf basis Flexural strength (Kg/mm$^2$) | Not converted to Vf basis Flexural elastic modulus (ton/mm$^2$) | Value converted to Vf = 60 vol % basis Flexural strength (Kg/mm$^2$) | Value converted to Vf = 60 vol % basis Flexural elastic modulus (ton/mm$^2$) | ILSS (Kg/mm$^2$) |
|---|---|---|---|---|---|---|
| 1 | 61.8 | 186 | 12.8 | 181 | 12.4 | 10.2 |
| 2 | 65.8 | 193 | 13.6 | 176 | 12.4 | 9.9 |
| 3 | 67.5 | 201 | 13.9 | 179 | 12.4 | 10.0 |
| 4 | 71.8 | 209 | 14.7 | 175 | 12.3 | 9.8 |
| 5 | 74.6 | 205 | 15.4 | 165 | 12.4 | 9.0 |
| 6 | 76.6 | 181 | 15.7 | 142 | 12.3 | 7.8 |
| 7 | 63.9 | 181 | 13.3 | 170 | 12.5 | 9.0 |
| 8 | 67.6 | 176 | 14.0 | 156 | 12.4 | 8.5 |
| 9 | 69.9 | 164 | 14.4 | 141 | 12.4 | 8.0 |
| 10 | 74.0 | 169 | 15.2 | 137 | 12.3 | 7.6 |
| 11 | 76.9 | 168 | 15.8 | 131 | 12.3 | 6.1 |
| 12 | 78.5 | 145 | 16.2 | 111 | 12.4 | 5.3 |
| 13 | 62.9 | 189 | 13.0 | 180 | 12.4 | 9.7 |
| 14 | 66.6 | 186 | 13.8 | 168 | 12.4 | 9.1 |
| 15 | 68.7 | 176 | 14.2 | 154 | 12.4 | 8.2 |
| 16 | 73.3 | 183 | 15.0 | 150 | 12.3 | 8.1 |
| 17 | 75.5 | 180 | 15.6 | 143 | 12.4 | 8.4 |
| 18 | 77.2 | 152 | 16.0 | 118 | 12.4 | 6.9 |
| 19 | 65.0 | 181 | 13.7 | 167 | 12.6 | 8.9 |
| 20 | 67.9 | 180 | 13.9 | 159 | 12.3 | 8.0 |
| 21 | 69.7 | 155 | 14.3 | 133 | 12.3 | 6.3 |
| 22 | 74.1 | 162 | 15.4 | 131 | 12.5 | 6.1 |
| 23 | 76.7 | 157 | 16.0 | 123 | 12.5 | 5.9 |
| 24 | 77.8 | 139 | 15.8 | 107 | 12.2 | 4.0 |

TABLE 3

| No. | Lengthwise prepreg Fiber basis weight (g/m$^2$) | Lengthwise prepreg Resin content (wt %) | Transversely reinforcing prepreg Fiber basis weight (g/m$^2$) | Transversely reinforcing prepreg Resin content (wt %) | Wall thickness of pipe (mm) | Weight of pipe (g) | Four-point flexural strength of pipe (Kg/mm$^2$) | Four-point flexural elastic modulus of pipe (ton/mm$^2$) |
|---|---|---|---|---|---|---|---|---|
| 1 | 165 | 23.0 | 27 | 37.3 | 0.64 | 20.54 | 146 | 12.3 |
| 2 (Compar.) | 150 | 30.0 | 27 | 37.3 | 0.65 | 20.62 | 128 | 10.7 |

TABLE 4

| No. | Lengthwise prepreg | | Transversely reinforcing prepreg | | Wall thickness of pipe (mm) | Weight of pipe (g) | Four-point flexural strength of pipe (Kg/mm$^2$) | Four-point flexural elastic modulus of pipe (ton/mm$^2$) |
| --- | --- | --- | --- | --- | --- | --- | --- | --- |
| | Fiber basis weight (g/m$^2$) | Resin content (wt %) | Fiber basis weight (g/m$^2$) | Resin content (wt %) | | | | |
| 1 | 152 | 25.0 | 27 | 37.3 | 0.61 | 19.5 | 112 | 17.2 |
| 2 (Compar.) | 139 | 33.0 | 27 | 37.3 | 0.62 | 19.9 | 80 | 17.0 |

TABLE 5

| No. | Prepreg | | Not converted to Vf basis | | Value converted to Vf = 60 vol % basis | | ILSS (Kg/mm$^2$) | Vf (Vol %) |
| --- | --- | --- | --- | --- | --- | --- | --- | --- |
| | Fiber basis weight (g/m$^2$) | Resin content (wt %) | Three-point flexural strength (Kg/mm$^2$) | Three-point flexural elastic modulus (ton/mm$^2$) | Three-point flexural strength (Kg/mm$^2$) | Three-point flexural elastic modulus (ton/mm$^2$) | | |
| 1 | 152 | 25.0 | 182 | 22.8 | 162 | 20.1 | 8.7 | 68.0 |
| 2 (Compar.) | 139 | 33.2 | 129 | 22.6 | 132 | 23.1 | 8.2 | 58.8 |

TABLE 6

| No. | Lengthwise prepreg | | Transversely reinforcing prepreg | | Wall thickness of pipe (mm) | Weight of pipe (g) | Four-point flexural strength of pipe (Kg/mm$^2$) | Four-point flexural elastic modulus (ton/mm$^2$) |
| --- | --- | --- | --- | --- | --- | --- | --- | --- |
| | Fiber basis weight (g/m$^2$) | Resin content (wt %) | Fiber basis weight (g/m$^2$) | Resin content (wt %) | | | | |
| 1 (Compar.) | 165 | 30.3 | 27 | 37.3 | 0.65 | 21.5 | 87 | 12.6 |

We claim:

1. A method for producing moldings which comprises laminating together unidirectionally-arranged carbon fiber prepregs containing 19-27% by weight of a thermosetting resin, and molding the laminate, so that the resin content reduction caused by the resin outflow may not exceed 2% by weight, thereby forming a molding of carbon fiber reinforced resin which contains 67-75% by volume of the carbon fiber.

2. The method of claim 1, wherein the resin outflow may not exceed 1% by weight.

3. The method of claim 1, wherein the molding of carbon fiber reinforced resin contains 69-73% by volume of carbon fiber.

4. The method of claim 1, wherein the molding pressure does not exceed 15 Kg/cm$^2$.

5. The method of claim 1, wherein the laminate is molded in the absence of a bleeder cloth.

6. The method of claim 1, wherein said prepreg is prepared by solventless hot-melt impregnation.

7. The method of claim 6, wherein the viscosity of said resin is from about 18 to about 24 poise at about 90° C.

8. The method of claim 1, wherein said resin is an epoxy resin.

9. The method of claim 7, wherein said resin is an epoxy resin.

10. The method of claim 8, wherein said epoxy resin is an a bisphenol A-diglycidyl ether type resin.

11. The method of claim 10, wherein said resin further comprises at least one member of the group consisting of diaminodiphenyl sulfone, dichlorophehyldimethylurea, bisphenol A and bisphenol F diglycidyl ether.

12. The method of claim 9, wherein said epoxy resin is a bisphenol A diglycidyl ether type resin.

13. The method of claim 12, wherein said resin further comprises at least one member of the group consisitng of diaminodiphenyl sulfone, dichlorophehyldimethylurea, bisphenol A and bisphenol F diglycidyl ether.

* * * * *